United States Patent [19]

Minami

[11] Patent Number: 4,815,132
[45] Date of Patent: Mar. 21, 1989

[54] STEREOPHONIC VOICE SIGNAL TRANSMISSION SYSTEM

[75] Inventor: Shigenobu Minami, Ayase, Japan

[73] Assignee: Kabushiki Kaisha Toshiba, Kanagawa, Japan

[21] Appl. No.: 901,877

[22] Filed: Aug. 29, 1986

[30] Foreign Application Priority Data

Aug. 30, 1985 [JP] Japan ................... 60-191746
Apr. 10, 1986 [JP] Japan ................... 61-082840

[51] Int. Cl.$^4$ ................................. H04S 1/00
[52] U.S. Cl. .................................... 381/1; 381/30; 381/31; 381/35
[58] Field of Search ............... 370/110.1; 381/1, 17, 381/18, 19, 20, 21, 22, 23, 30, 31, 35

[56] References Cited

U.S. PATENT DOCUMENTS

| | | | |
|---|---|---|---|
| 4,095,049 | 6/1978 | Gerzon | 381/20 |
| 4,205,201 | 5/1980 | Kahn | 370/110.1 |
| 4,251,685 | 2/1981 | Fellgett | 381/23 |
| 4,498,170 | 2/1985 | Noguchi et al. | 370/110.1 |
| 4,621,374 | 11/1986 | Micic et al. | 370/110.1 |

Primary Examiner—Forester W. Isen
Attorney, Agent, or Firm—Finnegan, Henderson, Farabow, Garrett, & Dunner

[57] ABSTRACT

In a stereophonic voice transmission system for transmitting voice signals of a plurality of channels, a transmitting end encodes main data consisting of at least one channel voice signal among a plurality of voice signals of a plurality of channels and additional data required for reproducing the voice signals of the remaining channels from the main data, and transmits coded main data and the coded additional data to a receiving end. The receiving end decodes the coded main data, and encodes and combines the main data with the additional data to reproduce the voice signals of the remaining channels, thereby transmitting stereophonic voice signals along a transmission line of a low transmission rate, with high quality at low cost.

19 Claims, 14 Drawing Sheets

FIG. 3
(A)
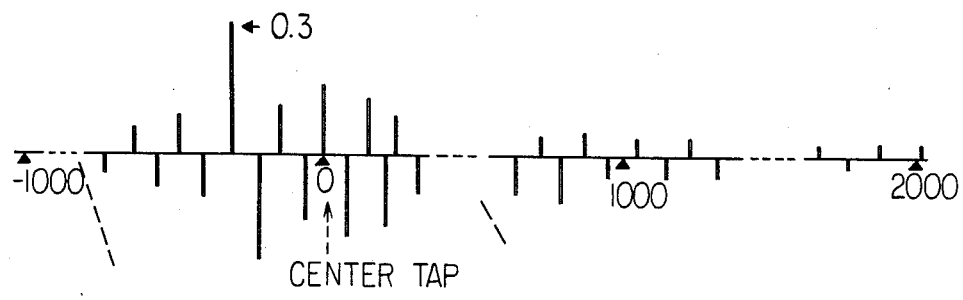
(B)
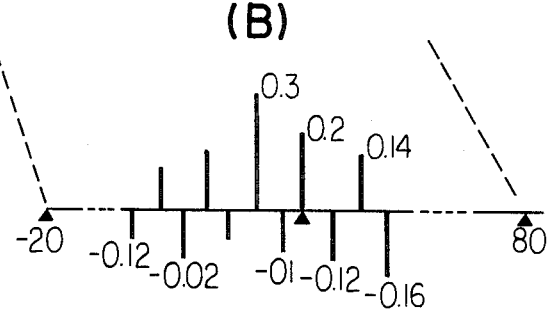
(C)
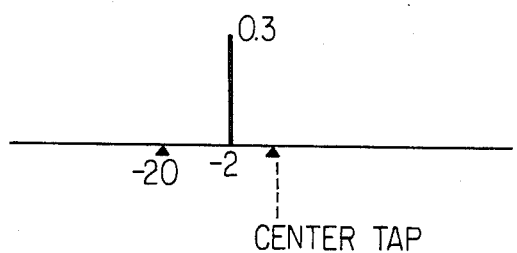

STEREOPHONIC VOICE SIGNAL TRANSMISSION SYSTEM

The present application claims priority of Japanese patent application No. 60-191746 filed on Aug. 30, 1985 and No. 61-82840 filed on Apr. 10, 1986.

Detailed Description of the Invention and Related Art Statement

The present invention relates to a voice transmission system and, more particularly, to a stereophonic voice signal transmission system.

Along with the development of telecommunications techniques, demand has recently arisen for teleconferencing systems for allowing attendants at remote locations to participate in a teleconference.

Conventional teleconferencing systems are adapted to transmit and receive image data (e.g., television image data, electronic balckboard data, and facsimile data) and voice data between remote terminals, so information transmission cost must be desirably reduced. In particular, if data can be transmitted at a bit rate of 64 bps in normal subscriber lines, a teleconferenceing system can be realized at low cost as compared with a high-quality teleconferencing system using optical fibers. A solution for low-cost teleconferencing is deemed to be the key to popularity and widespread applications of teleconferencing system in small and medium business corporations and at home when an ISDN (Integral Service Digital Network) for digitizing communications systems for individual subscribers is established.

In a teleconferencing system using, for example, a 64-bps transmission line, it is necessary to compress a large number of pieces of image and voice information so as not to interefere with conference proceedings.

FIG. 13 shows an overall system configuration of a conventional teleconferencing system. This system comprises a microphone 1, a loudspeaker 2, a television camera 3 as a man-machine image interface, a television monitor 4, an electronic blackboard 5, a facsimile system 6, a telewriting device 7, a voice unit 8 for coding voice data to 16-kbps data or decoding 16-kbps data to voice data, a control unit 9 (to be described in detail), a control pad 10 for inputting instructions to the control unit 9, an image unit 11 for coding an image data designated by the control unit 9 to 48-kbps data or decoding 48-kbps data to image data, and a transmission unit 13 for transmitting and receiving voice and image signals through a 64-kbps transmission line 12.

In a conventional teleconferencing system using a transmission line having a low bit rate, even monaural voice data must be compressed to 16-kbps data or the like by a voice data compression scheme such as an Adaptive Pulse Coded Modulation (ADPCM). Therefore, stereophonic voice data is not used in the conventional teleconferencing system.

Stereophonic voice is desirably adapted for a conventional teleconferencing system to create a feeling of being a participant in a conference and to discriminate between speakers.

If stereophonic voice having the above advantages is used in a conventional teleconferencing system using the transmission line of a low-bit rate as described above, a stereophonic voice transmission system shown in FIG. 14 is required. In the stereophonic voice transmission system, right- and left-channel voice signals are required to double the number of transmission data as compared with that in the monaural mode.

For this reason, if stereophonic voice is used in a conventional teleconferencing system using a low-bit rate, e.g., 64 kbps according to a conventional scheme, the following techniques are required:

(a) a technique for compressing one-channel voice transmission data to 8-kbps data; and (b) a technique for reducing the bit rate of image transmission data from 48 kbps to 32 kbps.

The technique (a) degrades voice quality, and the technique (b) results in voice quality degradation and/or poor service.

According to the conventional stereophonic transmission systems, it is very difficult to use stereophonic voice in teleconferencing system using a transmission line of a low-bit rate.

OBJECTS AND SUMMARY OF THE INVENTION

It is therefore, a first object of the present invention to provide a stereophonic voice transmission system capable of high-quality transmission and high-quality voice reproduction in a transmission line of a low-bit rate rate.

It is a second object of the present invention to provide a stereophonic voice transmission system comprising a small-capacity storage means and capable of transmitting and reproducing stereophonic voice of higher quality.

It is a third object of the present invention to provide a stereophonic voice transmission storage system capable of transmitting and reproducing high-quality stereophonic voice at low cost.

The above and other objects of the present invention will be apparent from the following description.

In order to achieve the above objects of the present invention, there is provided a stereophonic voice transmission system for transmitting a voice signal among the voice signals of a plurality of channels, and additional data required for use together with the main data to reproduce the voice signals of remaining channels, and sends coded main data and coded additional data, and a receiving end decodes the voice signal of each channel sent as the coded main data and reproduces the voice signals of the remaining channels by the coded main data and the coded additional data.

According to the present invention, in stereophonic voice transmission, only the main voice signal and difference signals or compressed difference signals are transmitted and then are received and combined by a receiving end. Therefore, data transmission can be performed by using a small number of data as compared with a conventional transmission storage system, and high-quality stereophonic transmission or storage can be achieved at low cost.

BRIEF DESCRIPTION OF THE DRAWINGS

FIGS. 3(A), 3(B) and 3(C) are graphs showing impulse response according to the second embodiment.

DETAILED DESCRIPTION OF THE INVENTION AND PREFERRED EMBODIMENTS

The present invention will be described in detail by exemplifying teleconferencing systems with reference to the accompanying drawings.

For the sake of simplicity, the transmission direction is represented by only one direction in the following description. A plurality of attendants or speakers (A1 to A4 or B1 to B4) in one of the conference rooms rarely speak simultaneously in a normal conference atmosphere. Even if the attendants in one conference room start to speak simultaneously, necessity for stereophonic voice transmission thereof is low as compared with the case wherein an individual attendant speaks and his voice data is to be transmitted. In the following description, a case will be exemplified wherein sounds from each speaker in the form of voice information in a conference are transmitted as stereophonic voice data.

The principle of stereophonic voice transmission according to the present invention will be described below.

Speaker's voice $X(\omega)$ (where $\omega$ is the angular frequency) in the form of a single utterance is input to right- and left-channel microphones $1_R$ and $1_L$, respectively. In this case, an echo component from a wall is neglected. If the right- and left-channel transfer functions are defined as $G_R(\omega)$ and $G_L(\omega)$, left- and right channel voice signals $Y_L(\omega)$ and $Y_R(\omega)$ are defined as follows:

$$Y_L(\omega) = G_L(\omega) \cdot X(\omega) \quad (1)$$

$$Y_R(\omega) = G_R(\omega) \cdot X(\omega) \quad (2)$$

Substitution of equation (2) into equation (1) yields the following equation:

$$Y_L(\omega) = (G_L(\omega)/G_R(\omega)) \cdot Y_R(\omega) \quad (3)$$

$$= G(\omega) \cdot Y_R(\omega) \quad (4)$$

The above equation indicates that the voice signals of the right- and left-channels can be reproduced only if the transfer function $G(\omega)$ and one of the $G_L$ signal channels are known.

According to the present invention, therefore, if the voice signal of one channel and a transfer function are transmitted (i.e., the voice signal of both channels need not be transmitted), the receiving end can reproduce the voice signals of right and left channels, thus realizing stereophonic voice transmission. In this case, the transfer function can be approximated by simple delay and attenuation if approximation precision is improved. The transfer function thus requires a smaller number of data as compared with the voice data $Y_L(\omega)$ so as to achieve stereophonic voice transmission.

Figure 1:
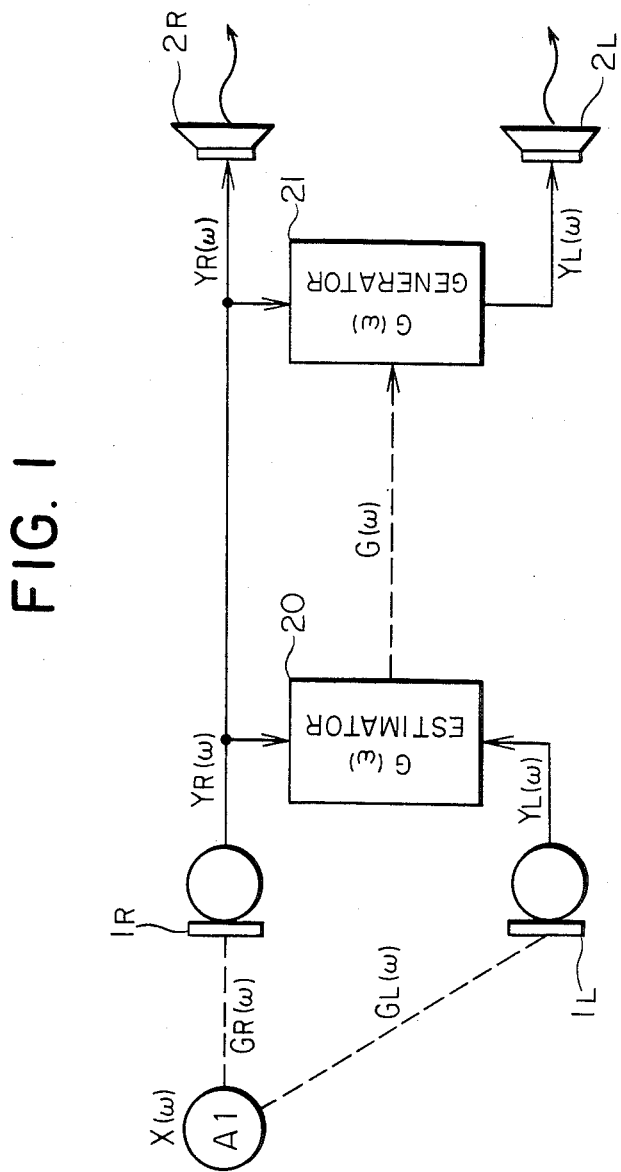
FIG. 1 is a schematic view of a stereophonic voice transmission system according to a first embodiment of the present invention.

FIG. 1 schematically shows a stereophonic voice transmission system according to a first embodiment of the present invention.

The stereophonic voice transmission system comprises left- and right-channel microphones 1L and 1R, loudspeakers 2L and 2R, an estimator 20 for estimating a transfer function $G(\omega)$, and a generator 21 for generating the transfer function $G(\omega)$ and the right-channel voice signal $Y_R(\omega)$ to produce the left-channel voice signal $Y_L(\omega)$.

Referring to FIG. 1 speaker's voice $X(\omega)$ from the speaker A1 is input as the voice signal $Y_R(\omega)$ at the right-channel microphone 1R and the voice signal $Y_L(\omega)$ at the left-channel microphone 1L. The transmitting end transmits the right-channel voice signal $Y_R(\omega)$ without modifications. The left-channel voice signal $Y_L(\omega)$ is input together with the right-channel voice signal $Y_R(\omega)$ to the estimator 20. The estimator 20 performs the following calculation to estimate the transfer function $G(\omega)$:

$$G(\omega) = Y_L(\omega)/Y_R(\omega)$$

The resultant transfer function $G(\omega)$ is transmitted.

The receiving end simply receives and reproduces the transmitted right-channel voice signal $Y_R(\omega)$. The transfer function $G(\omega)$ and the right-channel voice signal $Y_R(\omega)$ are input to the mixer 21, and the mixer 21 performs the following operation:

$$Y_L(\omega) = G(\omega) \cdot Y_R(\omega)$$

so that the left-channel voice signal is reproduced.

In this case, the transfer function $G(\omega)$ is derived from equations (3) and (4):

$$G(\omega) = G_L(\omega)/G_R(\omega) \quad (5)$$

where $G_R(\omega)$ and $G_L(\omega)$ are right- and left-channel transfer functions determined by the acoustic characteristic of the room and the speakers' positions. $G_R(\omega)$ and $G_L(\omega)$ are not influenced by speaker's voice $X(\omega)$.

The transfer function $G(\omega)$ is stationary according to equation (5) if the speaker is not changed to another location. The duration of most of the steady states are several hundred msec or longer.

The speaker's voice $X(\omega)$ is not stationary, and therefore the left- and right-channel voice signals $Y_L(\omega)$ and $Y_R(\omega)$ are not stationary according to equations (1) and (2). If the transfer function $G(\omega)$ is not very complicated, i.e., if an indoor reverberation time is not long, the number of data required for the transfer function $G(\omega)$ is smaller than for the voice signal $Y_L(\omega)$. Therefore, the technique of this embodiment which transmits the transfer function $G(\omega)$ is advantageous over the conventional stereophonic voice transmission technique which transmits the voice signal $Y_L(\omega)$ itself.

Figure 2:
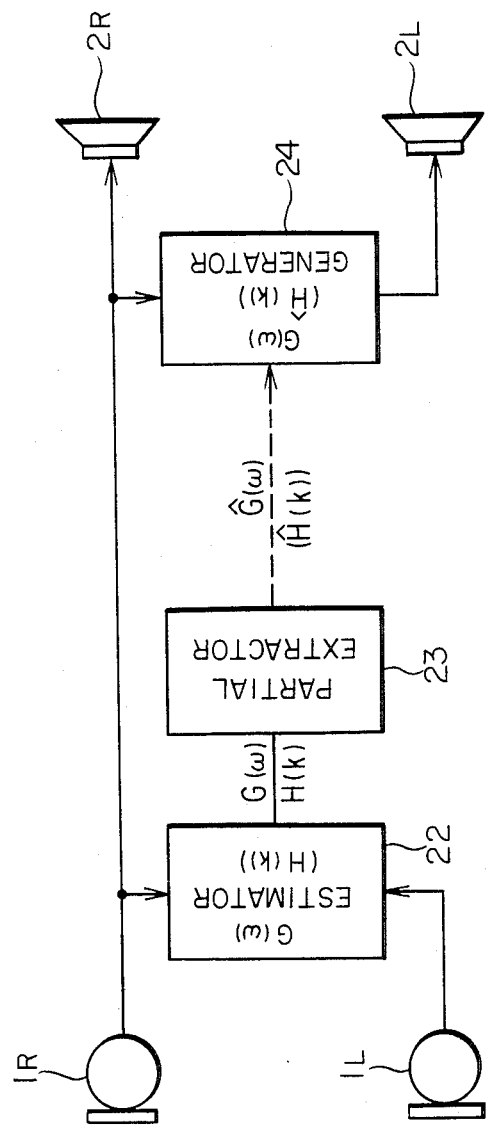
FIG. 2 is a schematic view of a stereophonic voice transmission system according to a second embodiment of the present invention.

FIG. 2 is a schematic view of a stereophonic voice transmission system according to a second embodiment of the present invention. This system comprises left- and right-channel microphones 1L and 1R, loudspeakers 2L and 2R, an estimator 22 for estimating a transfer function $\hat{G}(\omega)$ or impulse response $\hat{H}(k)$, a partial extractor 23 for extracting an approximated transfer function $\hat{G}(\omega)$ or an approximated impulse response $H(k)$, and a mixer 24 for producing the left-channel voice signal $Y_L(\omega)$ using the approximated transfer function $G(\omega)$ or the approximated impulse response $\hat{H}(k)$. The impulse response of the transfer function $G(\omega)$ at the kth sampling timing is given as follows:

$$H(k) = (h-m(k), h-m+1(k), \cdots, h_n(k))^T,$$

for $m > 0$, and $n > 0$
where T is the transposed matrix and $h_0(k)$ is the center tap.

In the same manner as in the first embodiment, the transmitting end sends the coded right-channel voice signal. The transfer function $G(\omega)$ or the impulse response $H(k)$ derived from the right- and left-channel voice signals is estimated by the estimator 22. As shown in FIG. 3(A), the impule response $H(k)$ has a waveform having a duration between $-1,000$ to $+2,000$ samples. For illustrative convenience, the speaker speaks for 500 msec on the average. In this case, assuming that each sampled value is quantized with 8 bits, and that the quantized signals are transmitted, a transmission rate required for transmitting this impulse response is as high as $8 \times 3,000 \times 2 = 48$ kbps.

For this reason, as shown in FIG. 3(B), part (e.g., samples between $-20$ and $+80$) of the impulse response is extracted by the partial extractor 23 and is then transmitted. In this case, the transmission rate is 1.6 kbps, which is desirably lower than 16 kbps of the ADPCM.

The stereophonic effects are determined by the phases and delay times of the voice. As shown in FIG. 3(C), only the position and magnitude of the main tap having the maximum magnitude among all taps are extracted and transmitted. In this case, the feeling of presence in the conference is slightly degraded. If eight bits are assigned to magnitude data and another eight bits are assigned to position data, the bit rate becomes 32 bps, thereby greatly reducing the bit rate.

At the receiving end, the transmitted right-channel voice signal is simply reproduced. The right-channel voice signal and the approximated transfer function $\hat{G}(\omega)$ or the approximated impulse response $\hat{H}(k)$ are mixed by the mixer 24 to reproduce the left-channel voice signal.

As described above, if the transfer function $G(\omega)$ is simple, it is advantageous to send the transfer function $G(\omega)$ in the place of the left-channel voice signal $Y_L(\omega)$. However, if the transfer function $G(\omega)$ is very complicated, it is less advantageous to send the transfer function $G(\omega)$ in place of the left-channel voice signal $Y_L(\omega)$. For this reason, in the second embodiment, the approximated transfer function $\hat{G}(\omega)$ or the approximated impulse response $\hat{H}(k)$ is sent in place of the transfer function $G(\omega)$, thereby reducing the number of data to be sent.

Figure 4:
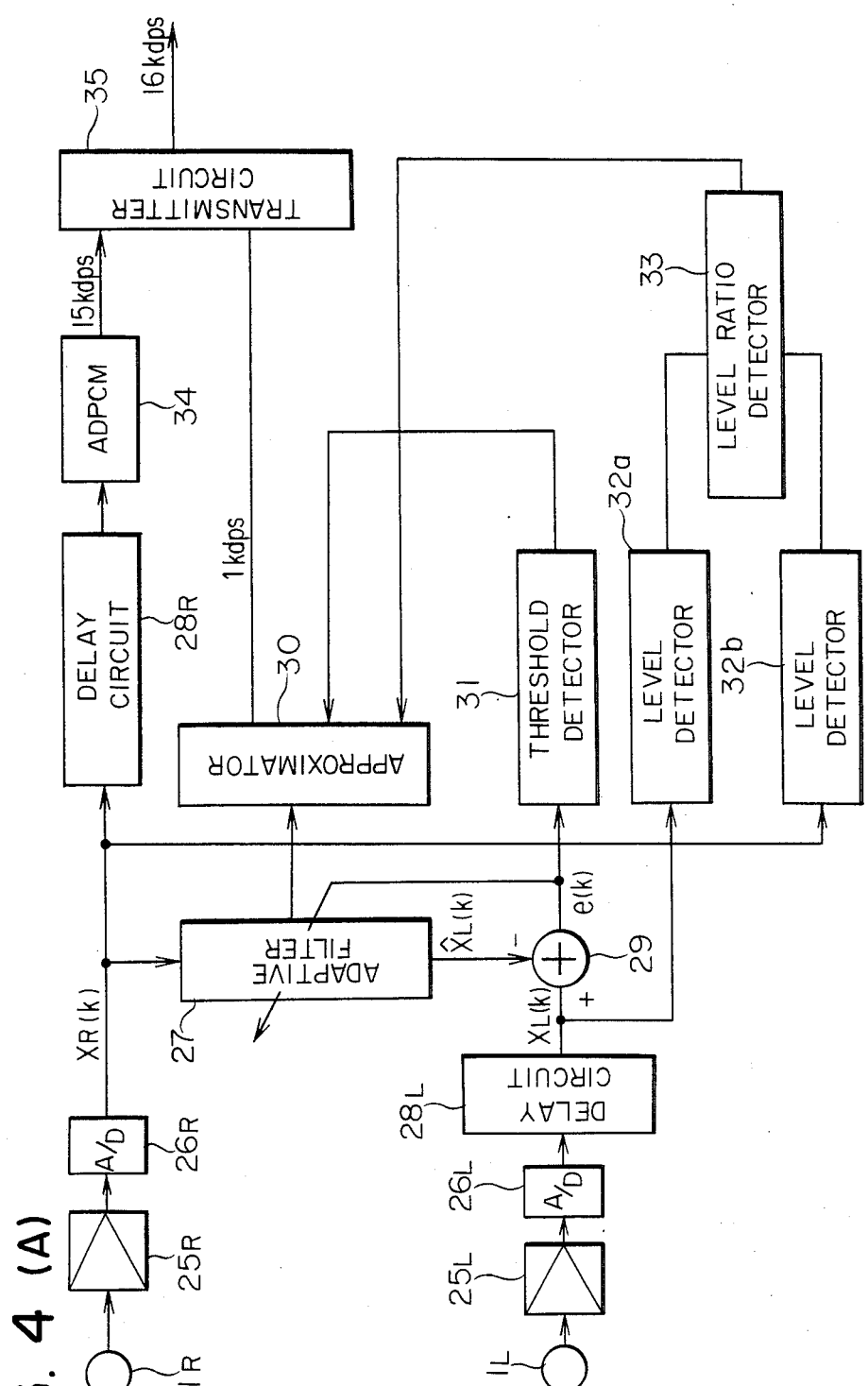
FIGS. 4(A) and 4(B) are block diagrams respectively showing transmitting and receiving ends in accordance with the method of the second embodiment.
Figure 4B:
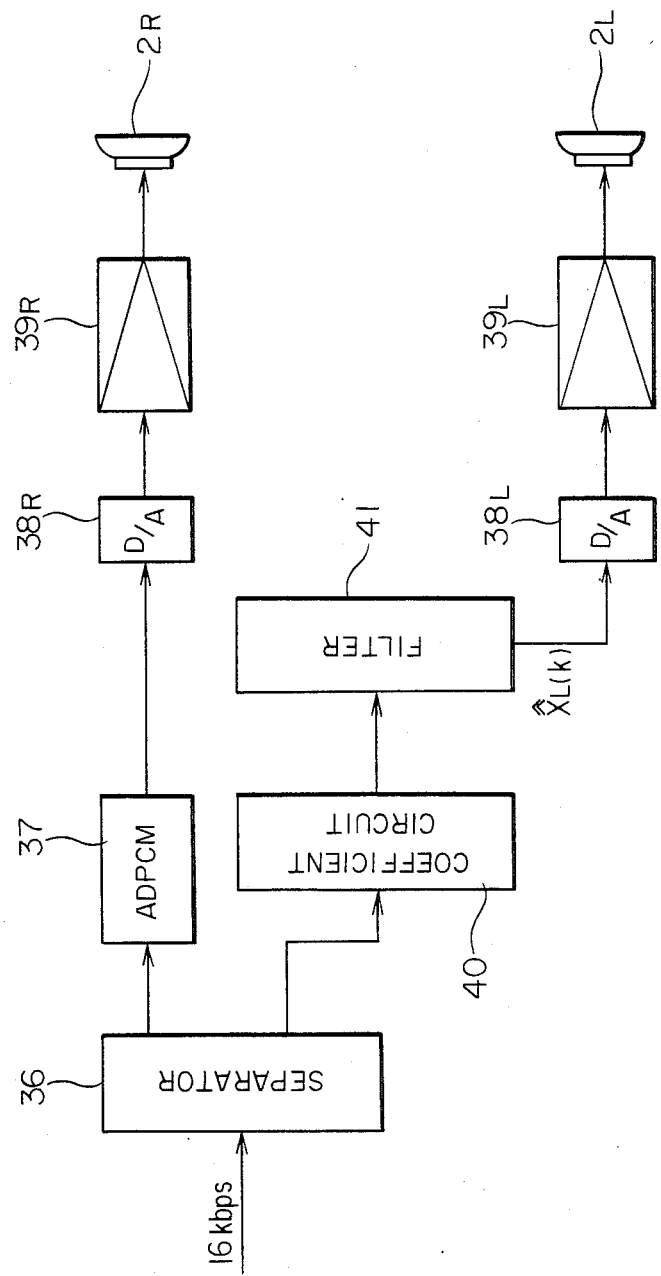

FIG. 4 is a blcok diagram of a transmitting end (A) and a receiving end (B) for performing transmission using an approximated impulse response.

The transmitting end (A) comprises microphones 1L and 1R, amplifiers 25L and 25R, A/D converters 26L and 26R, an adaptive filler 27, delay circuits 28L and 28R, a subtracter 29, an approximator 30, a threshold detector 31, level detectors 32a and 32b, a level ratio detector 33, an ADPCM circuit 34, and a transmitter circuit 35. The receiving end (B) comprises a separator 36, an ADPCM circuit 37, D/A converters 38L and 38R, amplifiers 39L and 39R, loudspeakers 2L and 2R, a coefficient circuit 40, and a filter 41.

The left- and right-channel voice signals are input at the microphones 1L and 1R and amplified by the amplifiers 25L and 25R to predetermined levels. The amplified signals are sampled by the A/D converters 26L and 26R at the sampling frequency of 1 kHz, thereby obtaining digital signals $X_L(k)$ and $X_R(k)$ at a kth sampling time.

The right-channel voice signal $X_R(k)$ is input to the 256-tap adaptive filter. The left-channel voice signal $X_L(k)$ is delayed by the circuit 28L by d samples so as to adjust the position of the center tap of the adaptive filter 27. The delayed signal is input as $X_L(k-d)$ to the subtracter 29. The subtracter 29 subtracts the output $X_L(k)$ of the adaptive filter from $X_L(k-d)$ to produce an error or difference signal $e(k)$. The adaptive filter uses the power of the error signal as an evaluation function and controls the tap coefficient so as to minimize the error power according to a known scheme such as identification by learning.

When learning of the adaptive filter advances, the following results can be obtained:

$$X_L(k-d) \approx \hat{X}_L(k)$$

therefore, the left-channel voice signal can be derived using the right-channel voice signal.

The approximator 30 compresses the tap coefficient data of the adaptive filter 27 to the required bit rate. Various approximation schemes may be proposed, as shown in FIGS. 3(A) to 3(C). In this embodiment, the scheme in FIG. 3(B) is used. The approximator selects the main tap coefficient h100(k) among the adaptive filter tap coefficients h1(k) to h256(k) and quantizes 23 tap coefficients from h89(k) to h111(k) into 8-bit codes at the bit rate of 1 kbps. The 8-bit main tap code and an 8-bit header representing the start of the data string are formatted into a frame in FIG. 5, and the resultant frame data is sent as additional data to the transmitter circuit 35.

Tap coefficient approximation in the adaptive filter 27 is performed whenever the speaker is changed. The threshold detector 31 detects that the error signal $e(k)$ exceeds a threshold value and then becomes lower than the threshold value, so that a change in speaker is detected.

This detection will be described in more detail with reference to FIG. 6.

Figure 6:
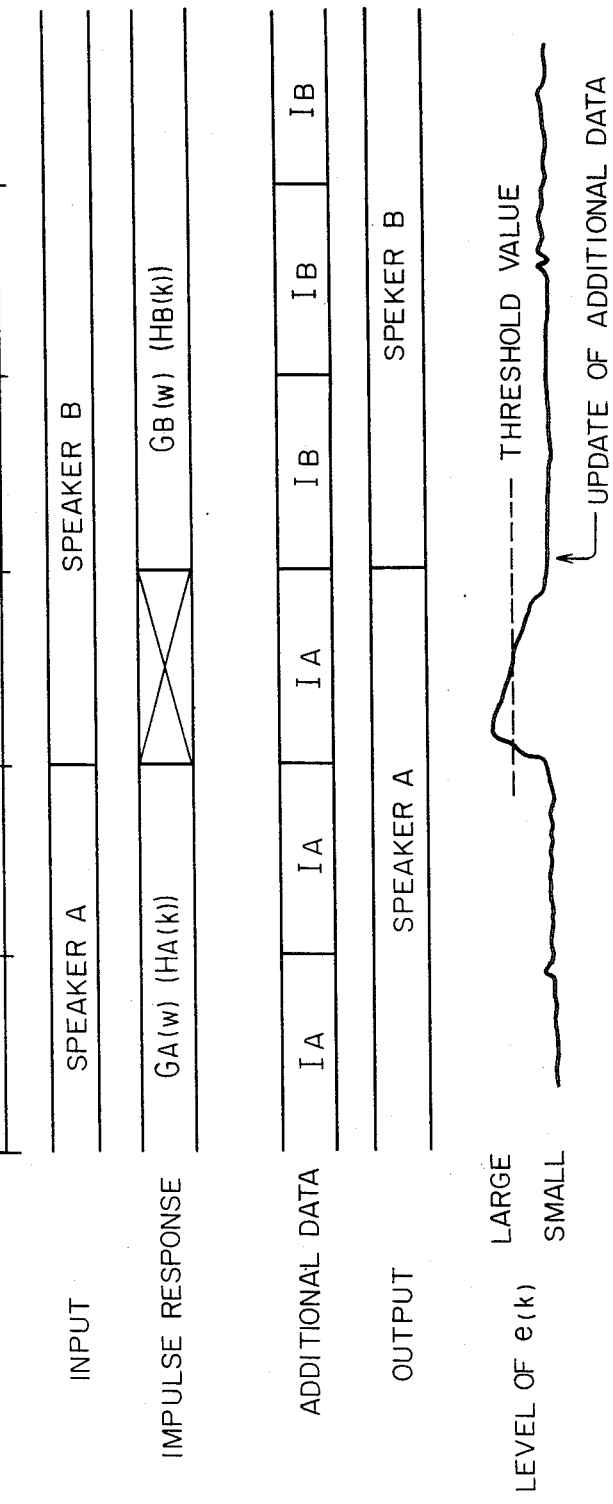
FIG. 6 is a timing chart for explaining the operation of the second embodiment.

Referring to FIG. 6., the speaker is changed from the speaker A to the speaker B after the lapse of 400 msec. In this case, the transfer function is changed from $G_A(\omega)$ to $G_B(\omega)$, and the impulse response is changed from $H_A(k)$ to $H_B(k)$. The adaptive filter 27 learns to follow the change in impulse response, and the tap coefficient is changed. Therefore, $X_L(k-d) \neq \hat{X}_L(k)$ is temporarily established. The level of the error single e(k) is increased. Thereafter, the level of the error signal e(k) is decreased below the threshold value, and the additional data is updated after the lapse of 600 msec as shown in FIG. 6.

Figure 5:
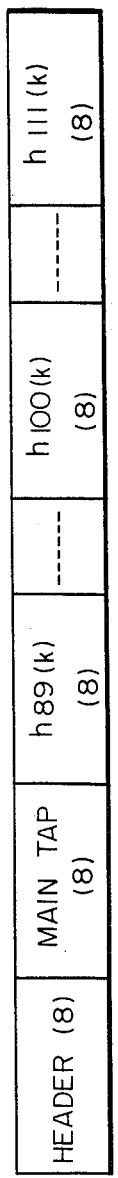
FIG. 5 is a chart showing a frame structure of the second embodiment.

In the transmitting end (A) in FIG. 5., the learning time of the adaptive filter 27 is set to be 200 msec or less. The additional data is updated 200 msec after the actual change in speakers. For this reason, the main data voice signal $X_R(k)$ is delayed by the delay circuit 29R by 200 msec so as to be synchronized with the additional data.

Since the additional data includes some of the adaptive filter tap coefficients, direct transmission thereof lowers the level of the resultant left-channel voice signal $\hat{X}_L(k)$ at the receiving end. In order to prevent this, the level detectors 32a and 32b and the level ratio detector 33 cooperate to detect a level ratio of $X_R(k)$ to $\hat{X}_L(k)$, and the approximator 30 corrects the approximated tap coefficient, thereby optimizing the level of the resultant left-channel voice signal $X_L(k)$. Thereafter, the additional data is sent as a 1-kbps frame to the transmitter circuit 35.

The transmitter circuit 35 mixes the additional data and main data obtained by converting the right-channel voice signal from the delay circuit 28R into a 15-kpbs ADPCM code from the ADPCM circuit 34 to produce a time compressed 16-kbps stereophonic voice data. This voice data is transmitted to the receiving end (B) through a transmission line.

The stereophonic voice data sent to the receiving end (B) is separated by the separator 36 into the 15-kbps right-channel voice signal of the main data and the 1-kbps additional data. The right-channel voice signal is decoded by the ADPCM circuit 37, and the decoded signal is converted by the D/A converter 38R to an analog signal. The analog signal is then amplified by the amplifier 39R and produced at the loudspeaker 2R.

On the other hand, the additional data is converted by the coefficient circuit 40 into 256 tap coefficients. These coefficients are supplied to the filter 41. The filter 41 uses the tap coefficients and the right-channel voice signal to produce the left-channel voice signal. The resultant left-channel voice signal is converted by the D/A converter 38L, amplified by the amplifier 39L, and produced at the loudspeaker 2L in the same manner as the right-channel voice signal.

Thus, the transmitted time-compressed data is time-expanded by the receiving end.

The above embodiment can be realized by using the current techniques, and the number of stereophonic signals necessary to be trnsmitted can be greatly reduced.

In this embodiment, the adaptive filter 27 and the filter 41 comprises transversal filtersof time region processing. However, these filters may be replaced with filters of frequency region processing to achieve the same effect as described above.

In addition, a correlator may be used in place of the adaptive filter to detect a tap having a maximum correlation value.

Figure 7:
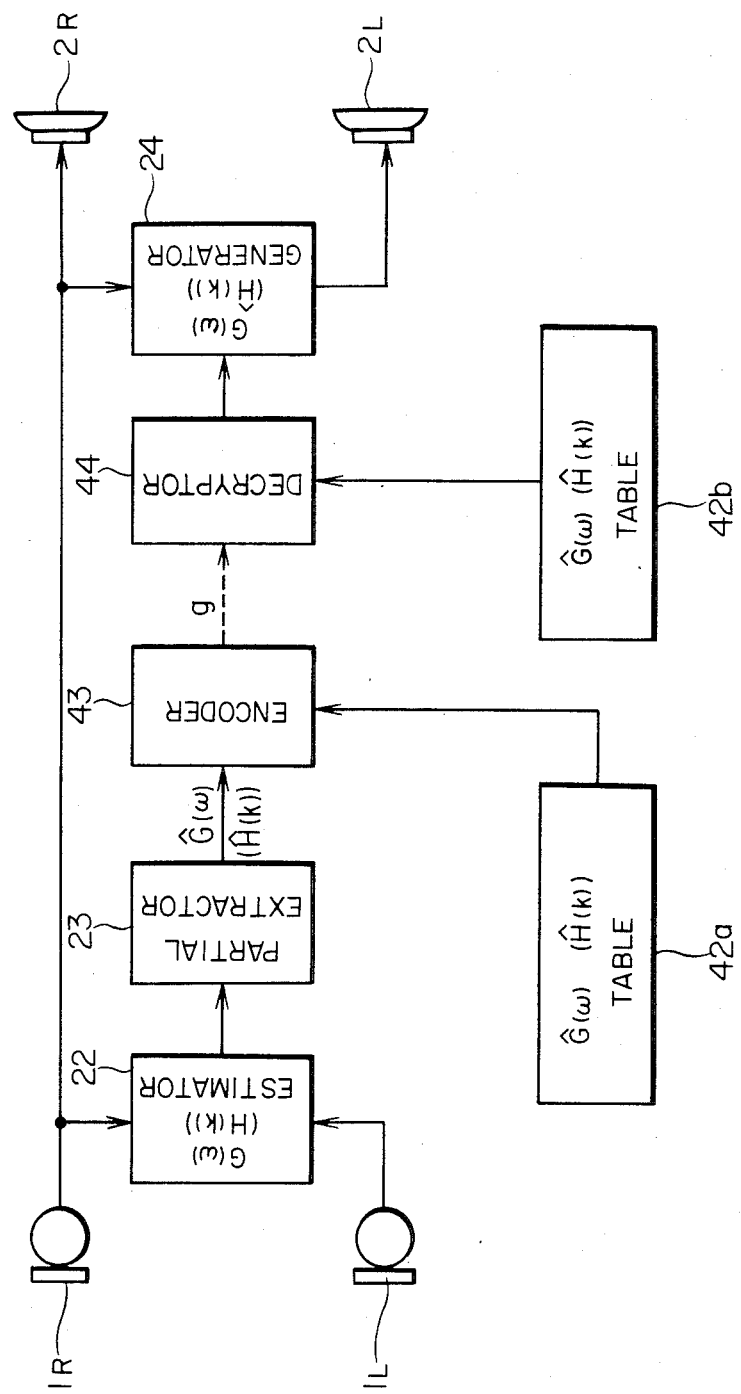
FIG. 7 is a schematic view of a stereophonic voice transmission system according to a third embodiment of the present invention.

FIG. 7 schematically shows a configuration of a stereophonic voice transmission system according to a third embodiment of the present invention. The stereophonic voice transmission system comprises left- and right-channel microphones 1L and 1R, loudspeakers 2L and 2R, an estimator 22 for estimating a transfer function $G(\omega)$ or an impulse response $H(k)$, a partial extractor 23 for extracting an approximated transfer function $\hat{G}(\omega)$ or an approximated impulse response $\hat{H}(k)$, tables 42a and 42b for prestoring reference approximated transfer functions $\hat{G}(\omega)$ and reference approximated impulse responses $\hat{H}(k)$, an encoder 43, a decryptor 44, and a generator 24 using the right-channel voice signal and the approximated transfer function $\hat{G}(\omega)$ or the approximated impulse response $\hat{H}(k)$ to produce the left-channel voice signal.

In this embodiment, in the transmitting end, the reference approximated transfer function $\hat{G}(\omega)$ or the reference approximated impulse response $\hat{H}(k)$ from the table 42a is compared by the encoder 43 with the approximated transfer function $\hat{G}(\omega)$ or the approximated impulse response $\hat{H}(k)$ extracted from th partial extractor 23. A code g representing the highest similarity between the prestored and the extracted data is transmitted. At the receiving end, the decryptor 44 receives the code g and the data read out from the table 42b to produce the approximated transfer function $\hat{G}(\omega)$ or the approximated impulse response $\hat{H}(k)$. The output from the decryptor 44 and the right-channel voice signal are mixed by the mixer 24 to produce the left-channel voice signal. According to this embodiment, if the acoustic characteristics in the conference room are known, the number of transmission signals are reduced, while the feeling of presence in a conference is maintained.

Figure 8:
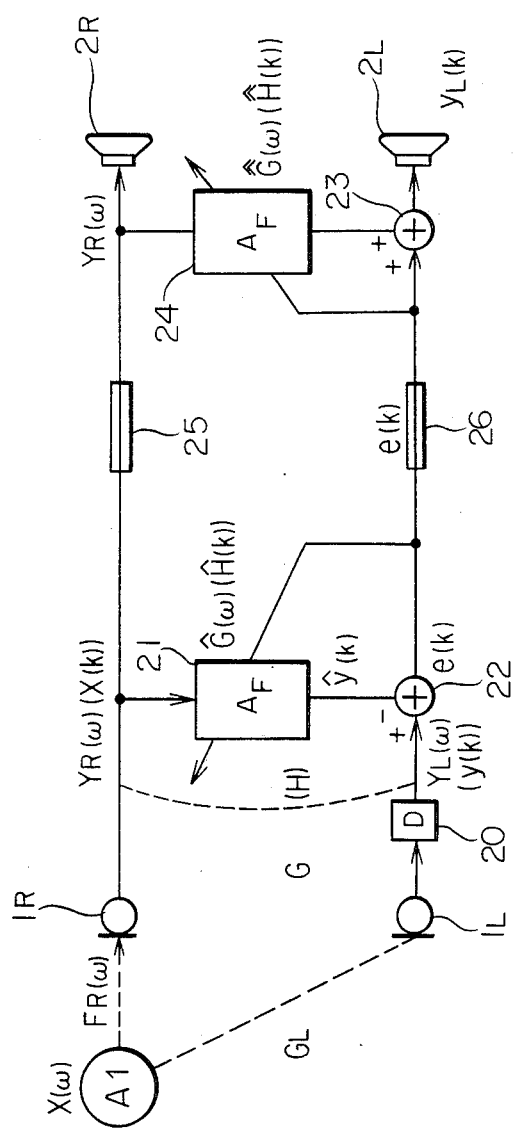
FIG. 8 is a schematic view of a stereophonic voice transmission system, according to a fourth embodiment of the present invention.

FIG. 8 schematically shows a stereophonic voice transmission system according to a fourth embodiment of the present invention.

A transmitting end in this stereophonic voice transmission system comprises left- and right-channel microphones 101R and 101L, a delay circuit 120 for delaying the left-channel microphone input voice signal, an estimator 121 for producing an estimated left-channel voice signal y(k) from the right-channel voice signal x(k) in the time region, and a subtracter 122 for subtracting the estimated left-channel voice signal y(k) from the left-channel voice signal y(k). A receiving end comprises left- and right-channel loudspeakers 102L and 102R, a mixer 123 for producing an estimated left-channel voice signal y(k) from the right-channel voice signal x(k), and an adder 124 for adding a difference signal to the left-channel voice signal y(k) estimated by themixer 123. The transmitting and receiving ends are connected through transmission lines 125 and 126. It should be noted x(k) and y(k) show values of the left- and right-channel voice signals at the kth sampling time.

Referring to FIG. 8, voice $X(\omega)$ output by a speaker A1 is input to the microphones 101R and 101L, and microphone input signals $Y_R(\omega)$ and $Y_L(\omega)$ are represented by transfer functions $F_R(\omega)$ and $G_L(\omega)$ determined by the propagation delays and the acoustic characteristics of the room. In this case, $\omega$ is the angular frequency.

$$Y_R(\omega) = F_R(\omega).X(\omega) \quad (101)$$

$$Y_L(\omega) = G_L(\omega).X(\omega) \quad (102)$$

The left microphone input signal $Y_L(\omega)$ is delayed with $C(\omega)$ in the delay circuit 120 so as to guarantee the cause-and-effect relationship in the estimator 121 and is represented by the transfer function $F_L(\omega)$ for an arrangement including components up to the delay circuit 120:

$$Y_L(\omega) = C(\omega).G_L(\omega).X(\omega) = F_L(\omega).X(\omega) \quad (103)$$

The left-channel voice signal $Y_L(\omega)$ is input to the subtracter 122.

The estimator 121 uses the left- and right-channel voice signals $Y_R(\omega)$ and $Y_L(\omega)$ is estimate the transfer function $G(\omega)$ for deriving the left-channel voice signal $Y_L(\omega)$ from the right-channel voice signal $Y_R(\omega)$ as follows:

$$G(\omega) = F_L(\omega)/F_R(\omega) \tag{104}$$

so that the estimated transfer function $G(\omega)$ can be obtained.

Figure 9:
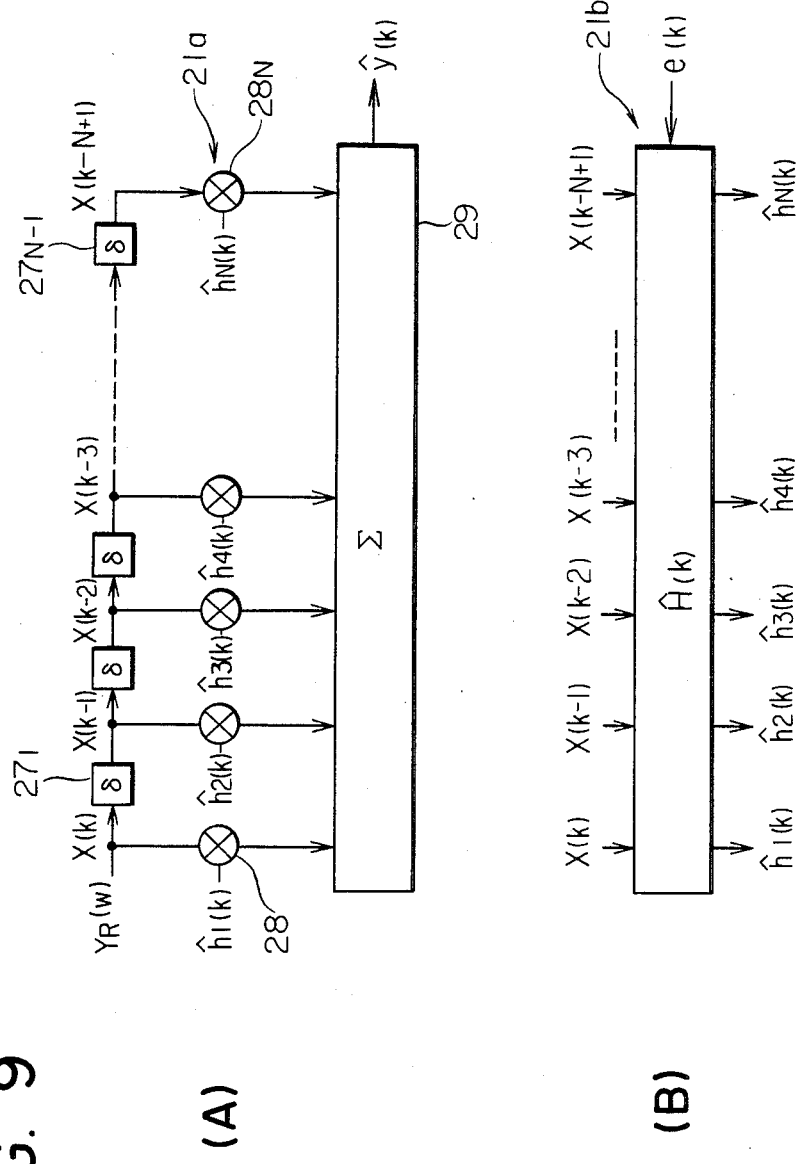
FIGS. 9(A) and 9(B) are block diagrams of an estimator according to the fourth embodiment.

The estimator 121 mainly includes an adaptive transversal filter 121a for calculating the estimated left-channel voice signal y(k) in the time region of FIG. 9(A), and a correction circuit 121b for sequentially updating the estimated input response H(k) of the transfer function $G(\omega)$ shown in FIG. 9(B). The adaptive transversal filter 121a and the correction circuit 121b are operated in synchronism with clocks.

The adaptive transversal filter 121a comprises n tap shift registers 127, multipliers 128 for multiplying the components of the estimated impulses response H(k) with the corresponding components of the right-channel voice signal X(k), and an adder 129 for adding outputs of the multipliers 128. The components of the right-channel voice signal input to the shift registers each having a delay time corresponding to one sampling time so that time-serial vector X(k) is produced as follows:

$$X(k) = (X(k), X(k-1), \ldots, X(k-N+1))^T \tag{105}$$

where T is the transposed vector.

If the estimated impulse response obtained by approximating the estimated transfer function $\hat{G}(\omega)$ in the time region is given as follows:

$$H(k) = (h1(k), h2(k), h3(k), \ldots, hN(k))^T \tag{106}$$

an estimated value $\hat{y}(k)$ of the left-channel voice signal y(k) can be obtained below:

$$\hat{y}(k) = \hat{H}(k)^T . X(k) \tag{107}$$

In this case, if the impulse response series H of the transfer function $G(\omega)$ is expressed as:

$$\hat{H} = (h1, h2, \ldots, hN)^T \tag{108}$$

and the transfer function can be effectively estimated as:

$$\hat{H}(k) = H \tag{109}$$

then the left-channel voice signal estimated value $\hat{y}(k)$ is an approximated of the actual left-channel voice signal y(k).

Estimation of the impulse response $\hat{H}(k)$ in the estimator 121 is performed by causing the correction circuit 121b to sequentially performed the following operation:

$$\hat{H}(k+1) = \hat{H}(k) + \alpha e(k).X(k)/\|X(k)\|^2 \tag{110}$$

for $\hat{H}(0) = 0$

The above algorithm is a known identification technique by learning. In equation (110), e(k) is the output from the subtracter 122 and given as follows:

$$e(k) = y(k) - \hat{y}(k) \tag{111}$$

and is the coefficient for determining a convergence rate and stability.

As a result, only the difference signal e(k) is sent as the left-channel data at the end of the above operations.

The receiving end has the generator 123 having the same arrangement as that of the estimator 121. The generator 123 sequentially traces the estimation results of the left-channel voice signals from the transmitting end according to the right-channel voice signal X(k) and the difference signal e(k) and calculates the estimated left-channel voice signal $\hat{y}(k)$ ($\hat{Y}_L(\omega)$) in the frequency region basis) from the following equation:

$$\hat{y}(k) = \hat{H}(k)^T.X(k) \tag{112}$$

$$\hat{H}(k+1) = \hat{H}(k) + \alpha e(k).X(k)/\|X(k)\|^2 \tag{113}$$

where $\hat{H}(k)$ is the estimated tap coefficient series in the generator and $H(0) = 0$.

Equations (112) and (113) in the receiving end are the same as equations (107) and (110) in the transmitting end, so that the estimated values $\hat{y}(k)$ and $\hat{y}(k)$ of the transmission and reception of the left-channel voice signal are given as follows:

$$\hat{y}(k) = \hat{y}(k) \tag{114}$$

The left-channel output $y_L$ in the receiving end, therefore, is given as a sum of the estimated value y(k) and the difference signal e(k) from the adder 124:

$$y_L(k) = \hat{y}(k) + e(k) = \hat{y}(k) + e(k) = y(k) \tag{115}$$

As a result, the left-channel voice can be properly reproduced.

The estimator 121 and the generator 123 in the stereophonic voice transmission system are adaptive transversal filters of the time region. However, these filters may be replaced with adaptive filters of the frequency region to obtain the same result as described above.

According to this scheme, the accurate more the approximation of the estimated values $\hat{y}(k)$ and $\hat{y}(k)$ of the left-channel voice, the less the power of e(k) becomes. The number of bits of e(k) can be smaller than that of y(k).

A fifth embodiment of the present invention will be described below.

Figure 10:
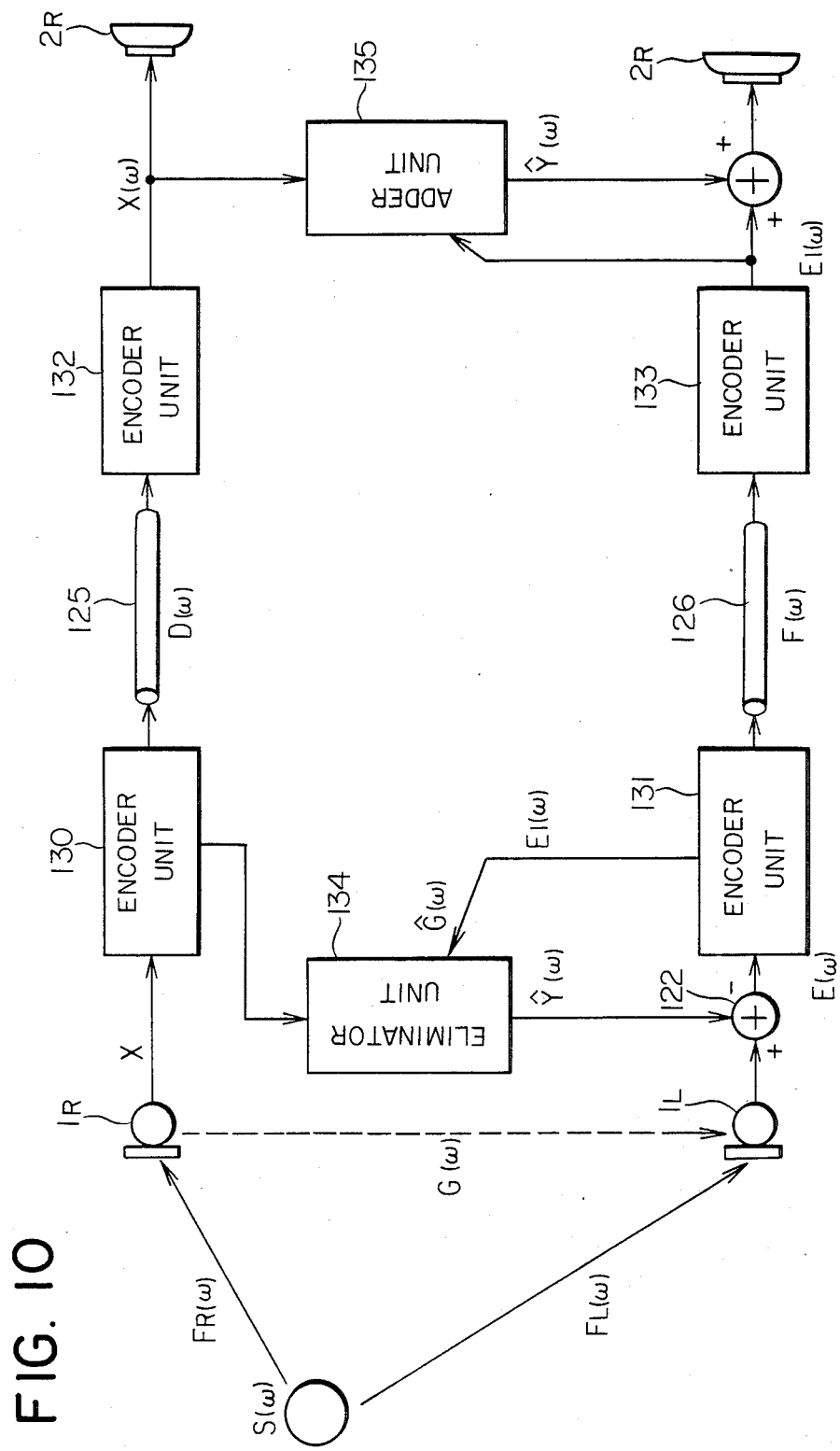
FIG. 10 is a schematic view showing a stereophonic voice transmission system according to a fifth embodiment of the present invention.

FIG. 10 schematically shows the configuration of a stereophonic voice transmission system of this embodiment.

In this embodiment, after a correlation component between the right- and left-channel voice signals is removed, the data is coded and decoded according to the ADPCM scheme. Transmission and storage of stereophonic voice can be performed using a small number of data. The same reference numerals as in FIG. 8 (the fourth embodiment) denote the same parts in FIG. 10.

Referring to FIG. 10, a transmitting end comprises a right-channel ADPCM encoder unit 130 and a left-channel ADPCM encoder unit 131. A receiving end comprises a right-channel ADPCM decoder unit 132 and a left-channel ADPCM decoder unit 133.

An interchannel correlation eliminator unit 134 has the substantially same function as that of the estimator 121 in FIG. 8, and an interchannel correlation adder unit 135 has the substantially same function as the mixer 124 in FIG. 8.

Single utterance voice S(ω) (where ω is the angular frequency) is input at right- and left-channel microphones 1R and 1L with right- and left-channel transfer functions $F_R(\omega)$ and $F_L(\omega)$ determined by the acoustic characteristics of the room and is converted to right- and left-channel voice signals X(ω) and Y(ω).

The interchannel correlation eliminator unit 134 in the transmitting end causes the ADPCM encoder units 130 and 131 (to be described in detail later) to produce the estimated transfer function $\hat{G}(\omega)$ according to an encoded right-channel voice signal $X_1(\omega)$ and a difference signal $E_1(\omega)$ as follows:

$$\hat{G}(\omega)=Y(\omega)/X(\omega)=F_L(\omega)S(\omega)/F_R(\omega)S(\omega)=R_L(\omega)/F_R(\omega) \quad (116)$$

A predicted value $\hat{Y}(\omega)$ is derived from:

$$\hat{Y}(\omega)=\hat{G}(\omega)X_1(\omega) \quad (117)$$

and is subtracted by the subtracter 122 from the left-channel voice signal Y(ω) to produce a predicted difference signal E(ω). The signal E(ω) is then input to the left-channel ADPCM encoder unit 131.

The encoder unit 131 sends the ADPCM coded difference signal F(ω) onto a transmission line 126. The encoder unit 131 has the same decoding function as the ADPCM encoder unit 133. A decoded difference signal $E_1(\omega)$ of the difference signal F(ω) decoded by the decoding function of the encoder unit 131 is input to the correlation eliminator unit 134.

The right-channel ADPCM encoder unit 130 sends the ADPCM encoded right-channel voice signal D(ω) onto a transmission line 125. The right-channel ADPCM encoder unit 130 has the same decoding function as that of the ADPCM decoder unit 132. A decoded signal $X_1(\omega)$ of the right-channel voice signal D(ω) decoded by the decoding function of the encoder unit 130 is input to the correlation eliminator unit 134.

At the receiving end, D(ω) and F(ω) are ADPCM decoded by the ADPCM decoder units 132 and 133, and the interchannel 135 performs the following calculations:

$$\hat{Y}(\omega)=\hat{G}(\omega)X_1(\omega) \quad (118)$$

$$Y_L(\omega)=E_1(\omega)+\hat{Y}(\omega) \quad (121)$$

therefore the left-channel voice signal $Y_L(\omega)$ is reproduced. In other words, the interchannel correlation adder unit 135 receives the decoded $X_1(\omega)$ and $E_1$ and estimates $\hat{G}(\omega)$.

Figure 11:
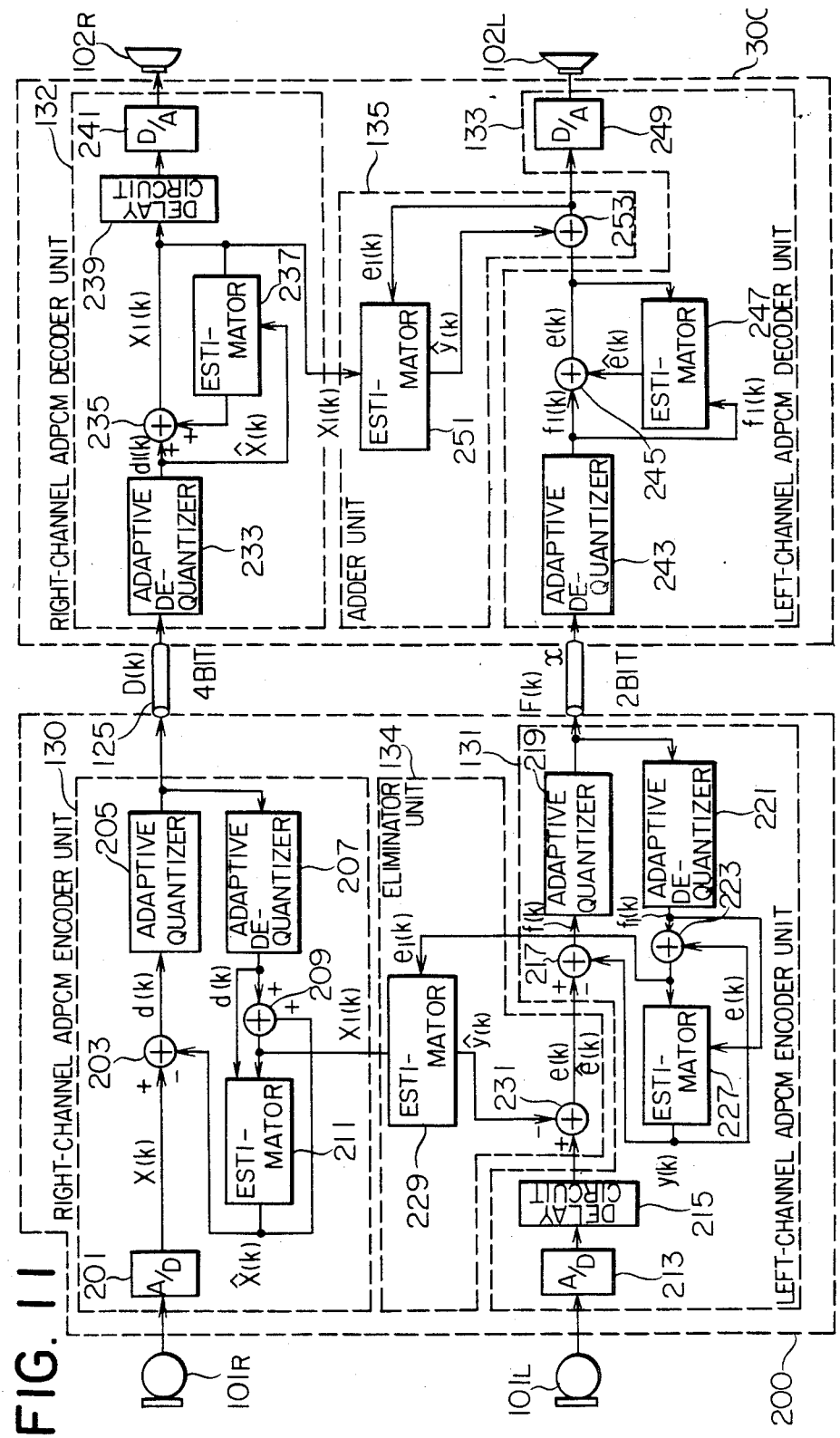
FIG. 11 is circuit diagram showing a detailed arrangement of a sixth embodiment of the present invention.

FIG. 11 is a detailed circuit diagram of this embodiment.

A transmitter end 200 in the stereophonic voice transmission system comprises a right-channel ADPCM encoder unit 130 for ADPCM encoding right-channel voice input at a right-channel microphone 101R, a left-channel ADPCM encoder unit 131 for ADPCM encoding left-channel voice y(t) input at a left-channel microphone 101L, and an interchannel correlation eliminator unit 134 for predicting the left-channel voice signal from the right-channel voice signal and eliminating the interchannel correlation component from the left-channel voice signal.

The ADPCM signals D(k) and F(k) output from the transmitter end 200 are sent to a receiving end 300 through transmission lines 125 and 126.

The receiving end 300 in the stereophonic voice transmission system comprises a right-channel ADPCM decoding unit 132 for decoding the right-channel ADPCM code D(k) and reproducing the right-channel voice signal $X_1(t)$, a left-channel ADPCM decoder unit 133 for decoding the left-channel ADPCM code F(k) and reproducing the left-channel correlation adder unit 135 for predicting the left-channel voice signal from the right-channel voice signal and adding the interchannel correlation component to the ADPCM decoded voice signal.

The respective components are described in detail below.

Right-Channel ADPCM Encoder Unit 130:

The right-channel ADPCM encoder unit 130 comprises an A/D converter 201, a subtracter 203, an adaptive quantizer 205, an adaptive dequantizer 207, an adder 209, and an estimator 211.

The digitized right-channel voice signal $\hat{x}(k)$ is subtracted by the estimator 211 from the predicted right-channel predicted voice signal $\hat{x}(k)$ to obtain a predicted difference signal d(k) representing a decrease in power lower than that of x(k) due to prediction. The difference signal d(k) is encoded by the adaptive quantizer 205 to an ADPCM code having a bit rate of about 32 kbps so as to adaptively vary the quantization step according to the amplitude of the input signal.

The estimator 211 causes the adder 209 to add the reproduced predicted difference signal $d_1(k)$ decoded by the adaptive dequantizer 207 and the output $\hat{x}(k)$ from the estimator 211 to input the same right-channel reproduced voice signal $X_1(k)$ as in the right-channel ADPCM encoder unit 132 in the receiving end. Adaptive filtering is performed to minimize the power of the reproduced predicted difference signal $d_1(k)$.

Left-Channel ADPCM Encoder Unit 131:

The left-channel ADPCM encoder unit 131 comprises an A/D converter 213, a delay circuit 215, a subtracter 217, an adaptive quantizer 319, an adaptive dequantizer 321, an adder 223, and an estimator 227.

The interchannel correlation eliminated signal e(k) obtained by eliminating the correlation component in the interchannel correlation eliminator unit 134 from the left-channel voice signal delayed by the delay circuit 215 is ADPCM encoded in the same manner as the right-channel voice signal.

The above-mentioned delay operation guarantees the cause-and-effect relationship of the right- and left-channel voice signals X(k) and y(k) (even if voice reaches the left-channel microphone faster than the voice arrival to the right-channel microphone, the left-channel voice signal is delayed for the input to the interchannel correlation unit 134).

The self-correlated voice component is eliminated by the estimator 227, and the correlated component of the right-channel voice signal mixed with the left-channel voice signal is eliminated by the interchannel correlation eliminator unit 134. Therefore, the left-channel voice signal can be compressed to an ADPCM code (e.g., above 16 kbps) shorter than the bit length of the right-channel voice data.

Interchannel Correlation Eliminator Unit 134:

The interchannel correlation eliminator unit 134 comprises an estimator 229 and a subtracter 231. The estimator 229 receives the right-channel reproduced voice signal $X_1(k)$ and produces the interchannel correlation component $\hat{y}(k)$. The estimator 229 performs adaptive filtering to optimize the characteristics of the filter characteristics so as to minimize the power of the left-channel predicted difference signal $e_1(k)$ in the receiving end 300.

Right-Channel ADPCM Decoder Unit 132:

The right-channel ADPCM decoder unit 132 comprises an adaptive dequantizer 233, an adder 235, an estimator 237, a delay circuit 239, and a D/A converter 241.

The received ADPCM code $D(k)$ is converted into the right-channel reproduced predicted difference signal $d_1$ by the adaptive dequantizer 233. The signal $d_1$ is added by the adder 235 to the right-channel predicted signal $\hat{X}(k)$ output from the estimator 237, thereby producing the right-channel reproduced voice signal $X_1(k)$.

Thereafter, in order for the encoder 200 to compensate for the left-channel delay effected by the delay circuit 239, the same length of delay time is added to the right-channel voice signal, is converted by the D/A converter 241, and is output at the loudspeaker 102R.

The estimator 237 receives the right-channel reproduced voice signal $X_1$ and performs adaptive filtering for producing a minimized predicted right-channel difference signal $d_1(k)$.

The estimator 237 is the same as the estimator 211 in the right-channel ADPCM encoding unit 130 and receives the same signal as therein. Therefore, the transmitting and receiving ends 200 and 300 output the same predicted signals $\hat{X}(k)$.

Left-Channel ADPCM Decoder Unit 133:

The left-channel ADPCM decoder unit 133 comprises an adaptive dequantizer 243, an adder 245, an estimator 247, and a D/A converter 249.

In the same manner as in the right-channel operation, the left-channel predicted difference signal $e_1(k)$ at the receiving end is produced from the received ADPCM code $F(k)$.

Thereafter, this signal is added by the interchannel correlation adder unit 135 to the correlation component $\hat{y}(k)$ to obtain the left-channel reproduced voice signal $y_1(k)$. This signal is converted by the D/A converter 249 into an analog signal. The analog signal is output at the loudspeaker 102L.

Interchannel Correlation Adder Unit 135:

The interchannel correlation adder unit 135 comprises an estimator 251 and an adder 253. The adder unit 135 receives the right-channel reproduced voice signal $X(k)$ and causes the estimator 251 to produce the interchannel correlation component $\hat{y}(k)$.

The estimator 251 has the same arrangement as in the transmitted end 200. The estimator 251 comprises an adaptive filter for learning to minimize the power of the receiving-end left-channel predicted difference signal $e_1$ in the same manner as in the transmitting end 200, thereby obtaining the same predicted value $\hat{y}(k)$ as in the transmitting end 200.

The estimator 229 (211, 227, 237, 247, or 251), the adaptive quantizer 205 (219), and the adaptive dequantizer 233 (207, 221, or 243) will be described in more detail.

Estimator 229:

Extensive studies have made on the types and arrangements of the estimator 229. For example, the estimator can perform prediction in the time region or the frequency region (e.g., FFT or Fast Fourier Transform). According to the present invention, any adaptive filter may be employed as the estimator 229. However, an adaptive transversal filter of the time region in FIG. 8 is used to constitute the interchannel estimator 229.

In the following description, $X_R(\omega)$ and $e(k)$ are substituted by $X_1(\omega)$ and $e_1(k)$, respectively.

The estimator 229 mainly includes the adaptive transversal filter 121a for calculating the estimated left-channel voice signal $\hat{y}(k)$ in the time region of FIG. 8A and the correlation circuit 121b for sequentially correcting the estimated impulse responses $\hat{H}(k)$ of the interchannel transfer function $G(\omega)$. The adaptive transversal filter 121a and the correction circuit 121b are operated in synchronism with the sampling clocks.

The adaptive transversal filter 121a comprises n tap shift registers 127, n multiplifers 128 for multiplying the components of the estimated impulse response $H(k)$ with the corresponding components of the right-channel voice signal $X(k)$, and an adder 129 for adding the outputs from the multipliers 128.

In the estimator 229, the respective components of the right-channel voice signal $X_1$ are input to the shift registers 127 each having a one-sampling delay time so that the time serial vector is produced as follows:

$$X_1(k) = (x_1(k), x_1(k-1), \ldots, x_1(k-N+1))^T \quad (120)$$

where T is the transposed vector.

On the other hand, if the estimated impulse response obtained by approximating the estimated transfer function $G(\omega)$ in the time region is defined as follows:

$$\hat{H}(k) = (h1(k), h2(k), h3(k), \ldots hN(k))^T \quad (121)$$

the estimated value $y(k)$ of the left-channel voice signal $y(k)$ is given as follows:

$$\hat{y}(k) = H(k)^T \cdot X_1(k) \quad (122)$$

In this case, if the impulse response series of the transfer function $G(\omega)$ is $$H = (h1, h2, \ldots, hN)^T \quad (123)$$

and the transfer function can be effectively estimated as $$H(k) \approx H \quad (124)$$

then the left-channel voice signal estimated value $\hat{y}(k)$ is a good approximate of the actual left-channel voice signal $y(k)$.

Estimation of the impulse response $\hat{H}(k)$ in the estimator 229 is performed by correction circuit 121b according to the following calculation for sequentially minimizing the power of $e_1(k)$:

$$\hat{H}(k+1) = \hat{H}(k) + \alpha e_1(k) \cdot X_1(k) / \| X_1(k) \|^2 \quad (125)$$

or $H(0) = 0$

This algorithm is known as the learning Identification Method.

In equation (125), $e_1(k)$ is a reproduced signal at the receiving end of an output (equation (126)) from the subtracter in FIG. 11:

$$e(k) = y(k) - \hat{y}(k) \quad (126)$$

and the coefficient for determining the convergence rate and stability in equation (125).

Figure 12:
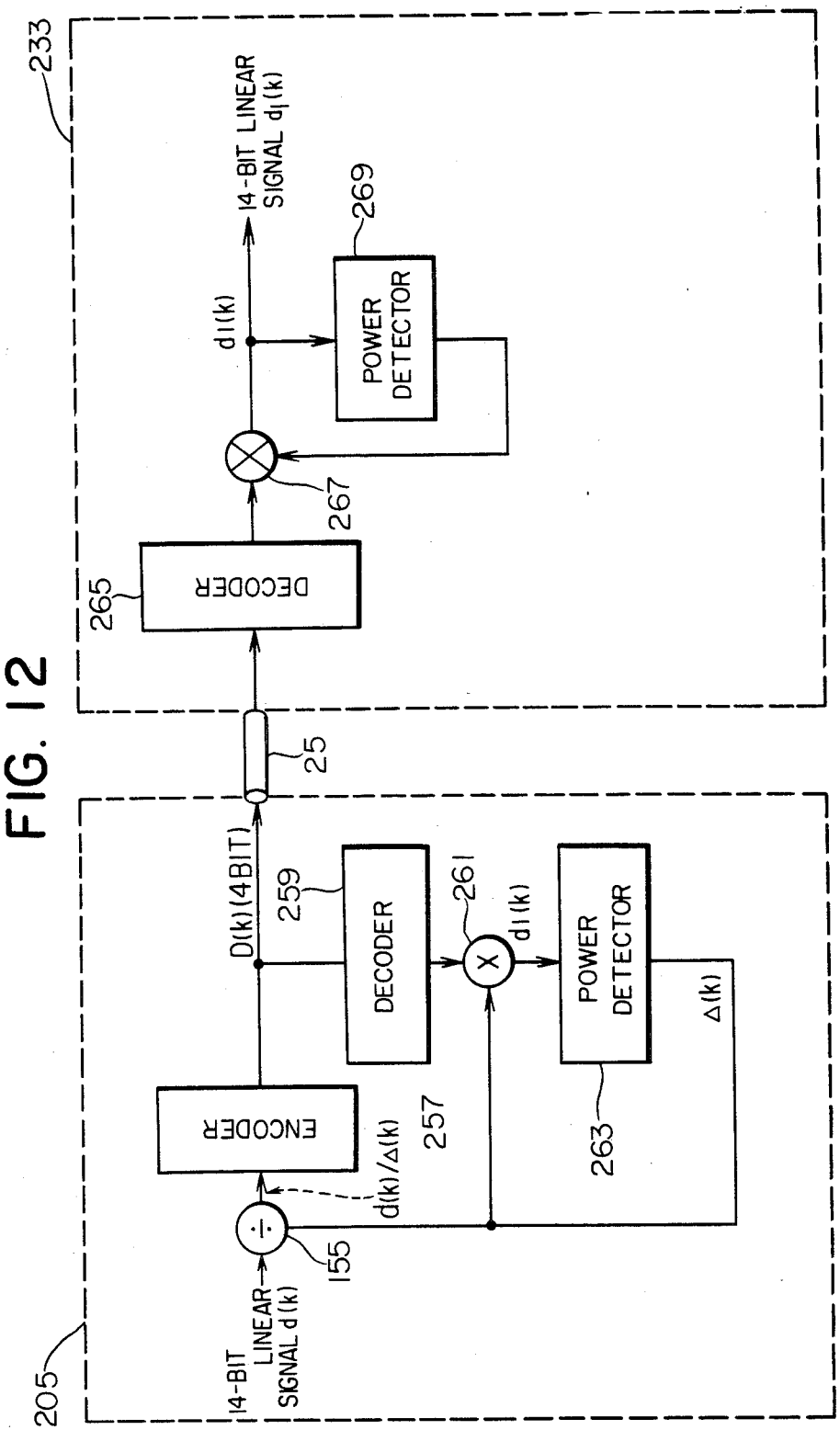
FIG. 12 is a block diagram of an adaptive quantizer and a dequantizer used in the circuit of FIG. 11
Figure 13:
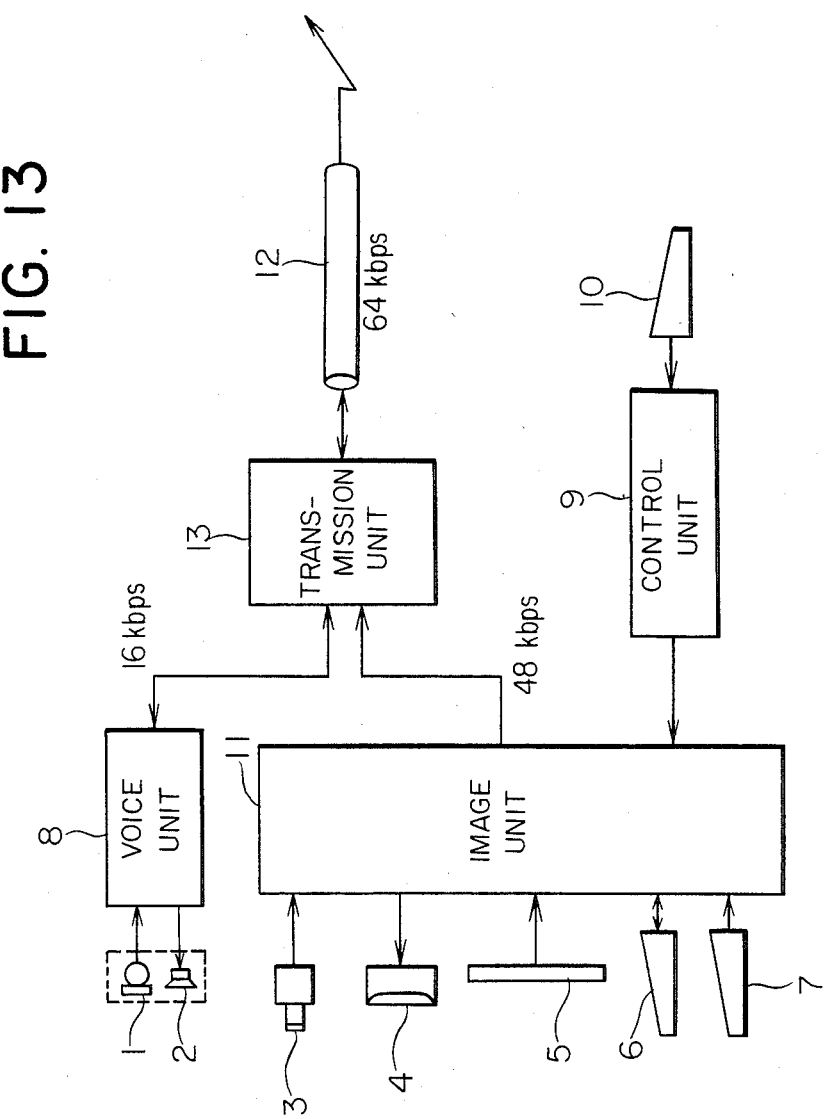
FIG. 13 is a schematic view of a conventional teleconferencing system.
Figure 14:
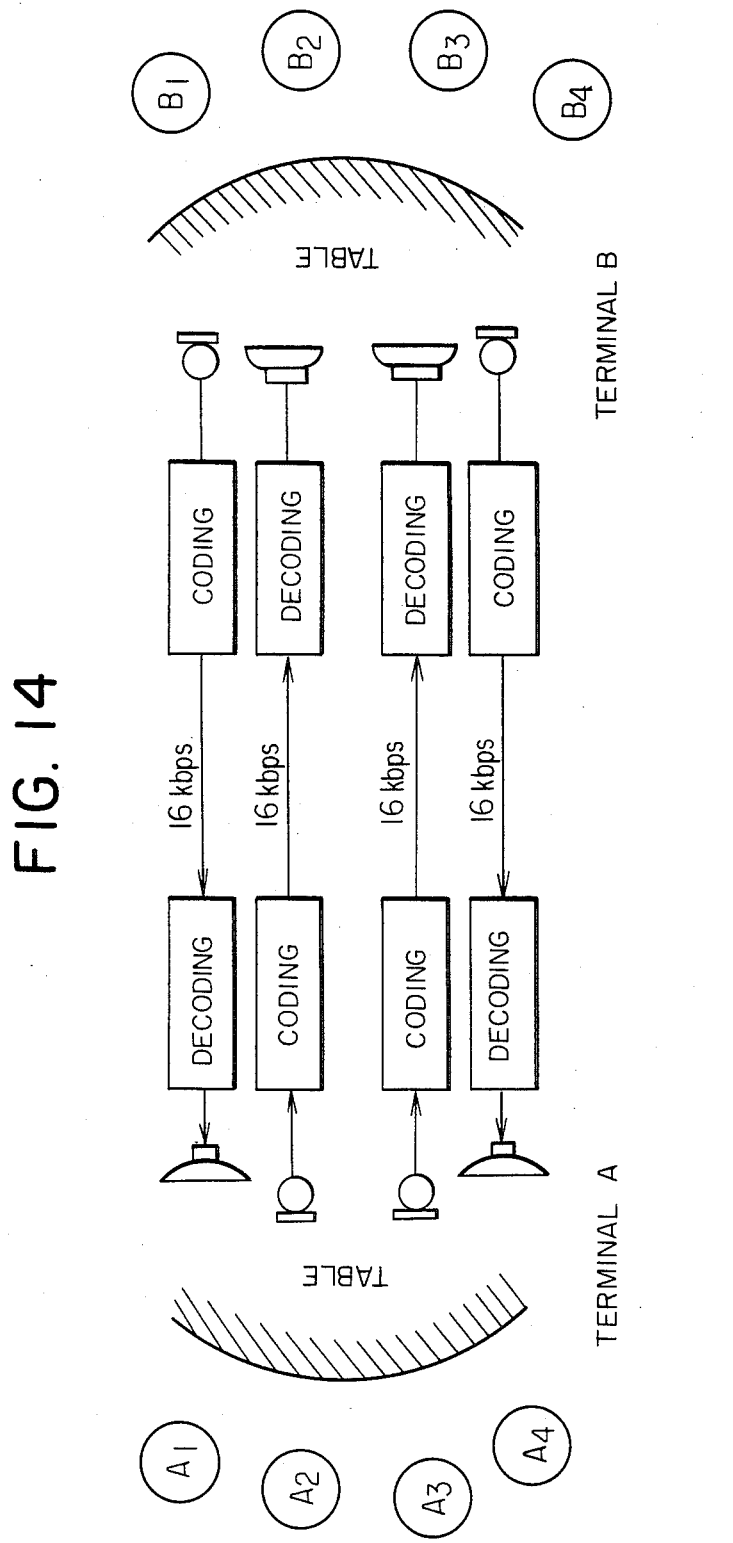
FIG. 14 is a schematic view showing a conventional stereophonic voice transmission system.

Adaptive Quantizer 205 and Adaptive Dequantizer 233:

FIG. 12 shows the configuration of the adaptive quantizer 205 and the adaptive dequantizer 233.

The adaptive quantizer 205 comprises a divider 255, an encoder 257, a decoder 259, a multiplier 261, and a power detector 263. The adaptive dequantizer 207 comprises a decoder 265, a multiplier 267, and a power detector 269.

For example, a 14-bit linear predicted difference signal d(k) in the transmitting end is divided by a quantization step $\Delta(k)$ and quantized. The quantized signal is encoded by the encoder 257 to an ADPCM code D(k) which is then sent onto the transmission line 125.

The signal decoded by the decoder 259 is multiplied by the multiplier 261 with the quantized step $\Delta(k)$ to produce a dequantized signal $d_1(k)$. The power detector 263 detects the power of the signal $d_1(k)$. By detecting this power, the quantization step $\Delta(k)$ is determined.

On the other hand, in the adaptive dequantizer 233, the ADPCM code is decoded by the decoder 265, and the decoded signal is multiplied by the multiplier 267 with the quantization step $\Delta(k)$, thereby producing the 14-bit receiving-end linear predicted difference signal. The quantization step $\Delta(k)$ is determined by detecting the power of $d_1(k)$ in the power detector 269 in the same manner as described above.

The above operations can be performed in the logarithmic region.

According to the fifth embodiment, the main voice signal and the difference signal are ADPCM encoded and the encoded signals are transmitted in stereophonic transmission. As compared with the stereophonic voice transmission, stereophonic transmission can be achieved by a smaller number of signals.

It is also possible to convert Adaptive Predictive Coding (APC) signals into stereophonic signals in the same manner as described above. In this case, the eliminated correlation coefficient in the ADPCM scheme is also sent to the receiving end.

In the fourth and fifth embodiments, the estimation algorithm is exemplified by identification by learning. However, a steepest descent method may be used in place of identification by leaning.

In the above embodiments, two-channel stereophonic voice transmission is exemplified. However, the present invention is not limited to such transmission, but may be extended to stereophonic voice transmission of three or more channels and is also applicable to voice storage as well as voice transmission According to the present invention as described above, only the main data consisting of the voice signal and the additional data required for reproducing the voice signals of the remaining channels in cooperation with the main data are sent to the receiving end. The number of data signals is not greatly increased as compared with the case of the monaural voice transmission. Therefore, a low-cost high-quality stereophonic voice transmission can be achieved even along a transmission line of a low transmission rate.

What is claimed is:

1. A stereophonic voice transmission system for transmitting a plurality of sound signals over a plurality of channels through a transmission line, said plurality of sound signals producing a main voice signal from a right channel and a sub-voice signal from a left channel, comprising:
   (a) a transmitting end including,
      estimating means for estimating additional data required for generating said sub-voice signal based on a predetermined formula using said main voice signal and said sub-voice signal as inputs, and
      transmitting means for coding and transmitting said main voice signal and said additional data; and
   (b) a receiving end including,
      receiving means for receiving and decoding said coded main voice signal and said coded additional data, and
      generating means for generating said main voice signal from said decoded main voice signal and for generating said sub-voice signal from said decoded additional data and said decoded main voice signal.

2. A system according to claim 1, wherein said additional data is a transfer function, an impulse response, or an approximated transfer function or an approximated impulse response.

3. A system according to claim 1 or 2, wherein said estimating means estimates a transfer function between a sound source and a respective one of a plurality of microphones, each of said microphones receiving as inputs a plurality of sound sources, and wherein said generating means generates a plurality of sound signals from said transfer function and said main voice signal.

4. A system according to claim 2, wherein said estimating means comprises:
   an estimator, said estimator estimating said transfer function or said impulse response between a sound source and a respective one of a plurality of microphones, each of said microphones receiving a plurality of sound sources, and
   said generating means includes means for generating a plurality of sound signals from said approximated transfer function or said approximated impulse response and at least one sound signal input to said microphone.

5. A system according to claim 1, wherein said additional data is identification data for identifying a transfer function, an impulse response, or a plurality of collected and stored data of approximated data of said transfer function or said impulse response.

6. A system according to claim 1, wherein said estimating means comprises,
   estimating circuit means for estimating a transfer function or an impulse response between a sound sound and a respective one of a plurality of microphones, each of said microphones receiving as inputs a plurality of sound sources,
   partial extractor means for extracting an approximated transfer function or an approximated impulse response for said transfer function or said impulse response,
   table means for prestoring a collected approximated transfer function or a collected impulse response, and
   encoder means for comparing said approximated transfer function or said approximated impulse response which is extracted by said partial extractor with said collected approximated transfer function or said collected approximated impulse response which is read out from said table means, and for encoding as a result a comparison therebetween; and
   wherein said generating means comprises,
   decryptor means for decrypting said encoded comparison into a corresponding approximated transfer function or a corresponding approximated impulse response, and means for generating a plurality of sound signals from a decrypted approximated transfer function or a decrypted approximated impulse response, and from at least one sound source received by one of said microphones.

7. A stereophonic voice transmission system for transmitting a plurality of sound signals through a transmission line, said plurality of sound signals producing a main voice signal from a right channel and a sub-voice signal from a left channel, comprising:
(a) a transmitting end including,
estimating means for estimating said sub-voice signal from said main voice signal, and for evaluating a difference signal between an estimated voice signal and said sub-voice signal, or for evaluating a compressed difference signal obtained by causing a compressing means to compress said difference signal, said estimating means controlling an estimation parameter, and
transmitting means for transmitting said main voice signal, and said difference signal or said compressed difference signal to a receiving end of another system; and
(b) a receiving end including,
receiving means for receiving and decoding said main voice signal, and said difference signal or said compressed difference signal,
estimating means, equivalent to that in said transmitting end, for evaluating a decoded difference signal or a decoded expanded signal obtained by causing an expanding means to expand said compressed difference signal from said transmitting end, said estimating means producing an estimated signal, and
generating means for generating said sub-voice signal by adding said difference signal or said expanded difference signal to said estimated signal produced by said estimating means.

8. A system according to claim 7, wherein said transmitting end comprises storage means for storing said main voice signal and said difference signal or said compressed difference signal therein.

9. A system according to claim 7, wherein said compressing means comprises an adaptive estimator or an adaptive quantizer.

10. A system according to claim 7, wherein said estimating means comprises a delay circuit means for delaying at least one sound signal of said plurality of sound signals, said estimating means estimating other ones of said plurality of sound signals in a time region according to said at least one sound signal, and a subtractor means for subtracting each of said estimated other sound signals from said at least one sound signal to obtain a difference signal;
wherein said receiving means comprises a generator means for generating said other sound signals in the time region from said at least one sound signal, and an adder means for adding each of said other sound signals produced by said generator to said difference signal.

11. A stereophonic voice transmission system for transmitting a plurality of sound signals, said plurality of sound signals producing a main voice signal from a right channel and a sub-voice signal from a left channel, through a transmission line, comprising:
estimating means for estimating additional data required for generating said sub-voice signal based on a predetermined formula using said main voice signal and said sub-voice signal as inputs; and
transmitting means for coding and transmitting said main voice signal and said additional data.

12. A stereophonic voice reception system for receiving a plurality of sound signals through a transmission line comprising:
receiving means for receiving and decoding a coded main voice signal from a right channel and coded additional data representative of a sub-voice signal from a left channel; and
generating means for generating said main voice signal from said decoded main voice signal and for generating said sub-voice signal from said decoded additional data and said decoded main voice signal.

13. A stereophonic voice transmission system for transmitting a plurality of sound signals through a transmission line, said plurality of sound signals producing a main voice signal from a right channel and a sub-voice signal from a left channel, comprising:
(a) a transmitting end including,
estimating means for estimating said sub-voice signal from said main voice signal,
compressing means for obtaining a compressed difference signal from a difference signal representative of a difference between an estimated sub-voice signal, and said sub-voice signal,
means for evaluating said compressed difference signal and for controlling an estimation parameter, and
transmitting means for coding and transmitting said main voice signal, and said difference signal or said compressed difference signal,
(b) a receiving end including,
receiving means for receiving and decoding said main voice signal, and said difference signal or said compressed difference signal,
estimating means, equivalent to that in said transmitting end, for evaluating said decoded difference signal or said compressed difference signal and for producing an estimated sub-voice signal, and
generating means for generating said sub-voice signal by adding said difference signal or said compressed difference signal to said estimated sub-voice signal.

14. The system according to claim 13, wherein said transmitting end comprises storage means for storing said main voice signal, and said difference signal, or said compressed difference signal.

15. The system according to claim 13, wherein said compressing means comprises an adaptive estimator.

16. The system according to claim 13, wherein said compressing means comprises an adaptive quantizer.

17. The system according to claim 13, wherein said plurality of sound signals are collected by a plurality of microphones.

18. The system according to claim 17, wherein said estimating means comprises:
delay circuit means for delaying at least one sound signal collected by one of said microphones, wherein said estimating means comprises circuit means for estimating other remaining sound signals input to said microphones over a predetermined time period, and
subtracter means for subtracting said estimated remaining sound signals from said at least one sound signal to obtain a difference signal, and wherein said generating means comprises circuit means for generating said remaining sound signals in the predetermined time period from at least one sound signal input to one of said microphones, and adder means for adding said remaining generated sound signals to said difference signal.

19. A system according to claim 1 or 7, wherein said system comprises a teleconferencing system.

* * * * *